United States Patent [19]

Komp et al.

[11] Patent Number: 4,572,587
[45] Date of Patent: Feb. 25, 1986

[54] ROAD WHEEL FOR A TRACK-LAYING VEHICLE

[75] Inventors: Uwe Komp; Klaus Henke, both of Dortmund; Johannes Wozniak, Lippstadt, all of Fed. Rep. of Germany

[73] Assignee: Hoesch Werke AG, Dortmund, Fed. Rep. of Germany

[21] Appl. No.: 559,798

[22] Filed: Dec. 9, 1983

[30] Foreign Application Priority Data

Dec. 11, 1982 [DE] Fed. Rep. of Germany ....... 3245910

[51] Int. Cl.$^4$ ........................ B62D 55/14; B21H 1/02; B21K 1/28
[52] U.S. Cl. ................................ 305/56; 305/28; 301/63 DD; 29/159.1
[58] Field of Search ...................... 305/28, 56, 57, 21, 305/23, 24; 301/63 DD, 63 DS, 36 WP; 474/901; 29/159 R, 159.01; 72/347, 349

[56] References Cited

U.S. PATENT DOCUMENTS 3,823,591 7/1974 Schröder et al. .................. 29/159 R

FOREIGN PATENT DOCUMENTS 1201693 4/1963 Fed. Rep. of Germany .
1939240 1/1969 Fed. Rep. of Germany .
2733307 2/1979 Fed. Rep. of Germany ........ 305/21
2020236 11/1979 United Kingdom .................. 305/28

*Primary Examiner*—David A. Scherbel
*Assistant Examiner*—Mack J. Abate
*Attorney, Agent, or Firm*—Karl Ross; Herbert Dubno

[57] ABSTRACT

A road wheel for a track-laying vehicle is composed of two wheel halves, each of which is deep drawn and pressed from a steel disk. The wheel halves have cylindrical and hub portions bridged by conical portions of different projection angles dimensioned so that the wheel half is of light weight, resistant to attack and of high strength.

10 Claims, 5 Drawing Figures

ROAD WHEEL FOR A TRACK-LAYING VEHICLE

FIELD OF THE INVENTION

Our present invention relates to a road wheel for a track-laying vehicle and to a method of making same. More particularly, the invention relates to a road wheel of the type wherein a vehicle chassis is supported on a track or tread for a military or construction vehicle, e.g. a tank, personnel carrier, crane or bulldozer and wherein the road wheel comprises two halves which are joined together to permit the teeth of the track to project between these halves.

BACKGROUND OF THE INVENTION

As will be apparent from pages 384–388 of "Principles of Automotive Vehicles", U.S. Government Printing Office, Washington, D.C., 1978, road wheels of a track-laying vehicle are provided between the chassis and the resilient suspension and are the members which ride upon the track as it is continuously laid down by the movement of the vehicle over the terrain.

Consequently, the road wheels serve to transmit the ground pressure from the chain to the chassis via the suspension and to support the weight of the chassis and the vehicle on the track and the ground.

For high speed track-laying vehicles, e.g. those used for military purposes, the configuration of the road wheel is especially important because it determines the handling characteristics of the vehicle and the wear characteristics which are significant. The road wheels are subjected to considerable stress in addition to wear. In general such road wheels can be assembled from wheel halves, e.g. by bolting them together, the two wheel halves defining between them an outwardly open groove into which the teeth of the track project.

Because it is important to keep the unsuspended mass of the vehicle as small as possible to avoid vibration and the like, in order to allow high speeds, the weight of the wheels is an important factor and should be minimized. However, it must be borne in mind that the friction stresses, especially in the regions in which the teeth engage into the wheel are significant and that the wheels must also be capable of withstanding attack by explosives or projectiles.

Thus there are a number of mutually contradictory or conflicting requirements for such wheels. In order to minimize the weight of the road wheels of track-laying vehicles, it has been proposed to form the wheel halves of aluminum. To minimize the wear in the tooth-engaging regions of the wheel, the wheel was provided in the region of a channel with wear-resisting rings of high strength steel (see German patent document DE-AS No. 19 39 240). However, such wheels did not fulfill all requirements, since they were prone to attack by incendiary or explosive means, the aluminum wheels readily melting or even burning upon such attack.

Steel wheels can overcome the latter disadvantage and thus are proposed in German patent document DE-AS No. 12 01 693. These wheels are provided with wear-resisting regions of polyamide synthetic resins where wear is paramount as in the locations at which the teeth of the track penetrate into the wheel channel. However, such steel wheels are comparatively heavy.

OBJECTS OF THE INVENTION

It the principal object of the present invention to provide a road wheel for a tank, personnel carrier, construction vehicle or other track-laying vehicle whereby disadvantages of the earlier road wheels described previously are obviated.

Another object of this invention is to provide a road wheel which is of light weight, of high strength and resistance to attack, high thermal refractoriness, and subject to minimal wear.

Still another is to provide an improved method of making a road wheel for a track-laying vehicle.

SUMMARY OF THE INVENTION

These objects and others which will become apparent hereinafter are attained in accordance with the present invention, with a road wheel of the type described wherein each half of the road wheel is pressed (stamped or forged), especially draw pressed (deep drawn) from a planar disk of steel of a given thickness to form a planar hub portion which lies perpendicular to the axis of the wheel, a cylindrical track-engaging portion forming the periphery of the wheel and a pair of conical portions connecting the hub with the track-engaging portion.

These conical portions include a slightly conical tooth-flanking portion which is connected directly with the cylindrical portion and defines a projection angle with a plane perpendicular to the axis and hence to the plane of the hub portion, and a steeply conical portion connecting the slightly conical portion with the hub portion. The steeply conical portion defines a respective projection angle with the hub portion and hence with a plane perpendicular to the axis of the wheel. All of these portions are coaxial with one another and concentric with the aforementioned axis and according to the invention, the wall thickness of the steeply conical portion is substantially equal to the product of the cosine of its projection angle and the thickness of the disk or flank from which the wheel is drawn, while the thickness of the slightly conical portion is equal to the product of the cosine of its projection angle and the thickness of the disk. Furthermore, the wall thickness of the cylindrical or track-engaging portion according to the invention is between 0.6 and 0.8 times the thickness of the disk whereas the wall thickness of the hub portion during the pressing, deep drawing or stamping operation can be reduced to 0.5 to 0.7 times the thickness of the disk.

It is surprising that, when manufactured to conform to the requirements given above, the wheel assembled from the two wheel halves can have a minimum weight and yet considerable strength so that it fulfills all of the requirements of the road wheel for a heavy-track vehicle. It is resistant to attack by incendiary, explosive or projectile weapons and it can be fabricated at a comparatively low cost.

Best results are obtained when the wall thickness of the cylindrical track-engaging portion is 0.7 times the thickness of the starting disk and the wall thickness of the hub portion is 0.6 times this thickness.

An exceptionally high wear resistance in the tooth receiving region of the wheel can be obtained when this high-wearing zone e.g. the region of the slightly conical tooth-flanking portion, is subjected to a heat treatment capable of increasing the wearing resistance. This heat treatment can involve case hardening or the diffusion of hard facing materials into the high-wear zone. In this manner we are able to achieve a high degree of wear resistance without having to clad the tooth-flanking portion with an additional member and thus we eliminate the possibility that any such additional wear-resistant member may break loose and jam against a tooth causing damage to the track or the wheel.

According to another embodiment of the invention, the tooth-engaging or tooth-flanking region of the wheel may be subjected, after deep drawing under the conditions described, to a reduction in thickness to 0.5 to 0.7 times the thickness of the starting disk, thereby forming a recess in which a wear-resistant ring can be mounted. This wear-resistant ring can have a conical configuration and can lie along the tooth-flanking slightly conical portion over at least part of the height of a tooth and can also be recessed in the cylindrical outer surface of the wheel half which rolls upon the track. Preferably the tooth-receiving region has a thickness of 0.6 times the thickness of the disk.

In still another embodiment of the invention, the running surface of the wheel, i.e. the cylindrical surface, is recessed toward the wheel axis so that in this region the wheel diameter is reduced by twice the wall thickness to a wear ring which can be inserted in the resulting recess so as to lie flush with the outer cylindrical surface of the wheel.

The wheel halves are advantageously produced by a method which involves deep drawing and pressing the disk to the configuration and dimensions described and, where a wear ring is to be inserted, the corresponding wall portions can be machined away to accommodate the wear ring which can be bonded by welding, explosion bonding or other means to the wheel.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 4:
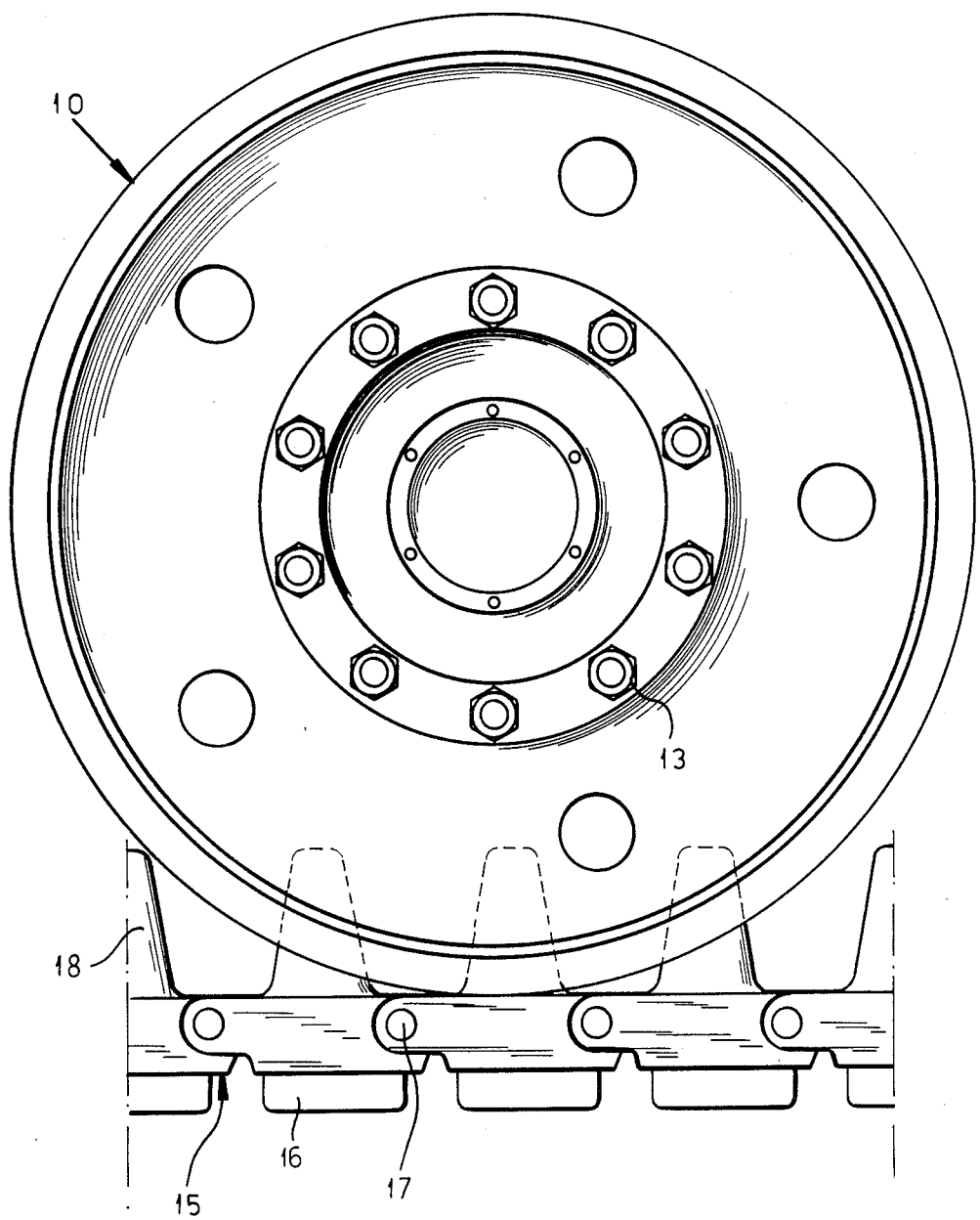
FIG. 4 is an elevational view of a road wheel according to the invention shown in its relationship to the tracks.
Figure 5:
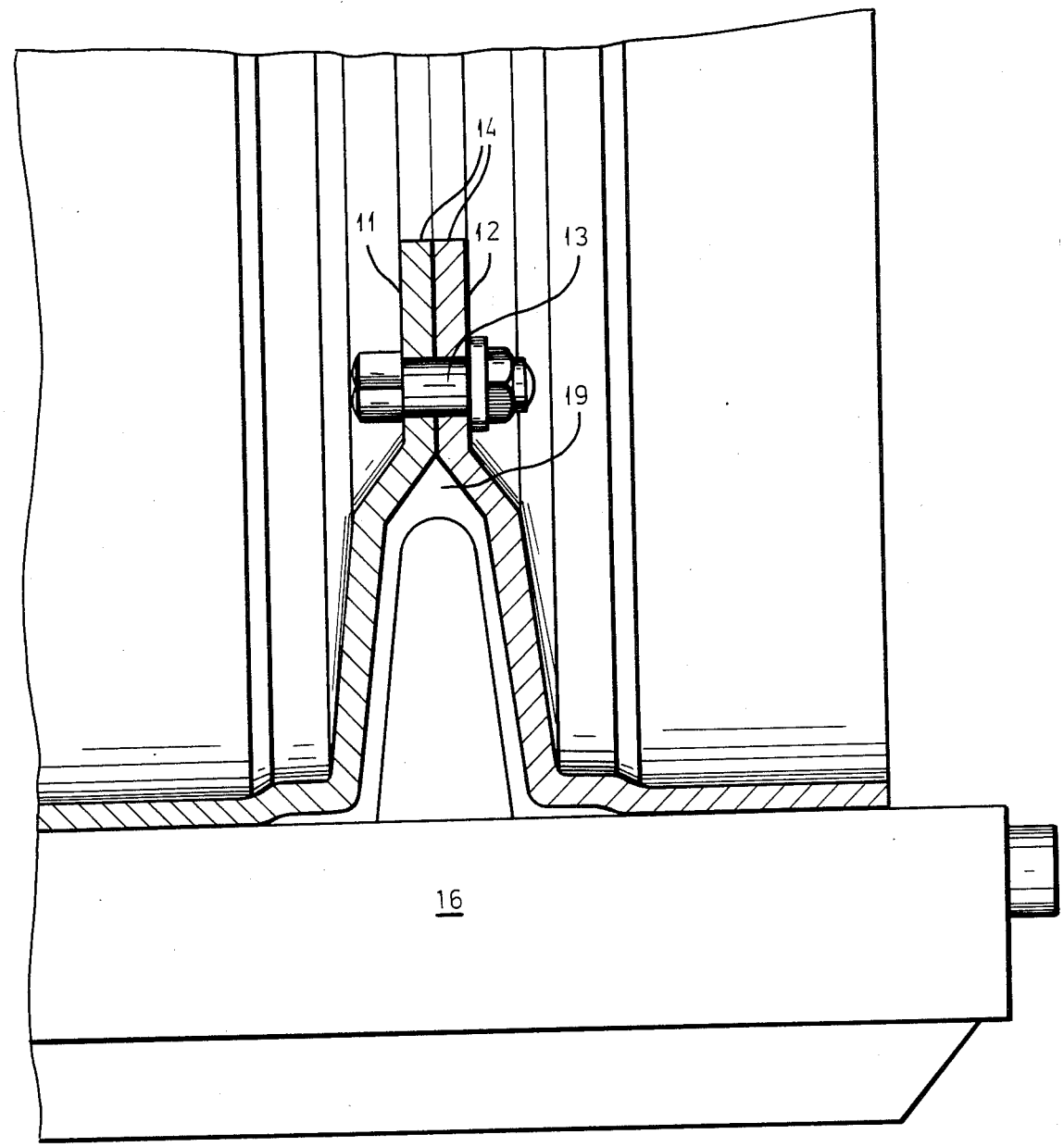
FIG. 5 is a fragmentary axial section through the wheel and showing the same on a tread of this track.

Referring first to FIGS. 4 and 5, it can be seen that the road wheel 10 of a track vehicle can comprise a pair of wheel halves 11 and 12 which can be secured together by bolts 13. Via the hub 14 formed by the corresponding portion of the two halves of the wheel, the road wheel can be mounted on an arm or the like connected to the chassis or body of the vehicle or the usual suspension.

The road wheel has cylindrical running surfaces which ride upon the track 15, here shown to be composed of a plurality of treads 16 which are linked together at 17.

The track has teeth 18 of conventional design which reach into a channel 19 formed between the two wheel halves and defined by the tooth-flanking portions thereof as will be developed below.

Figures 1, 2:
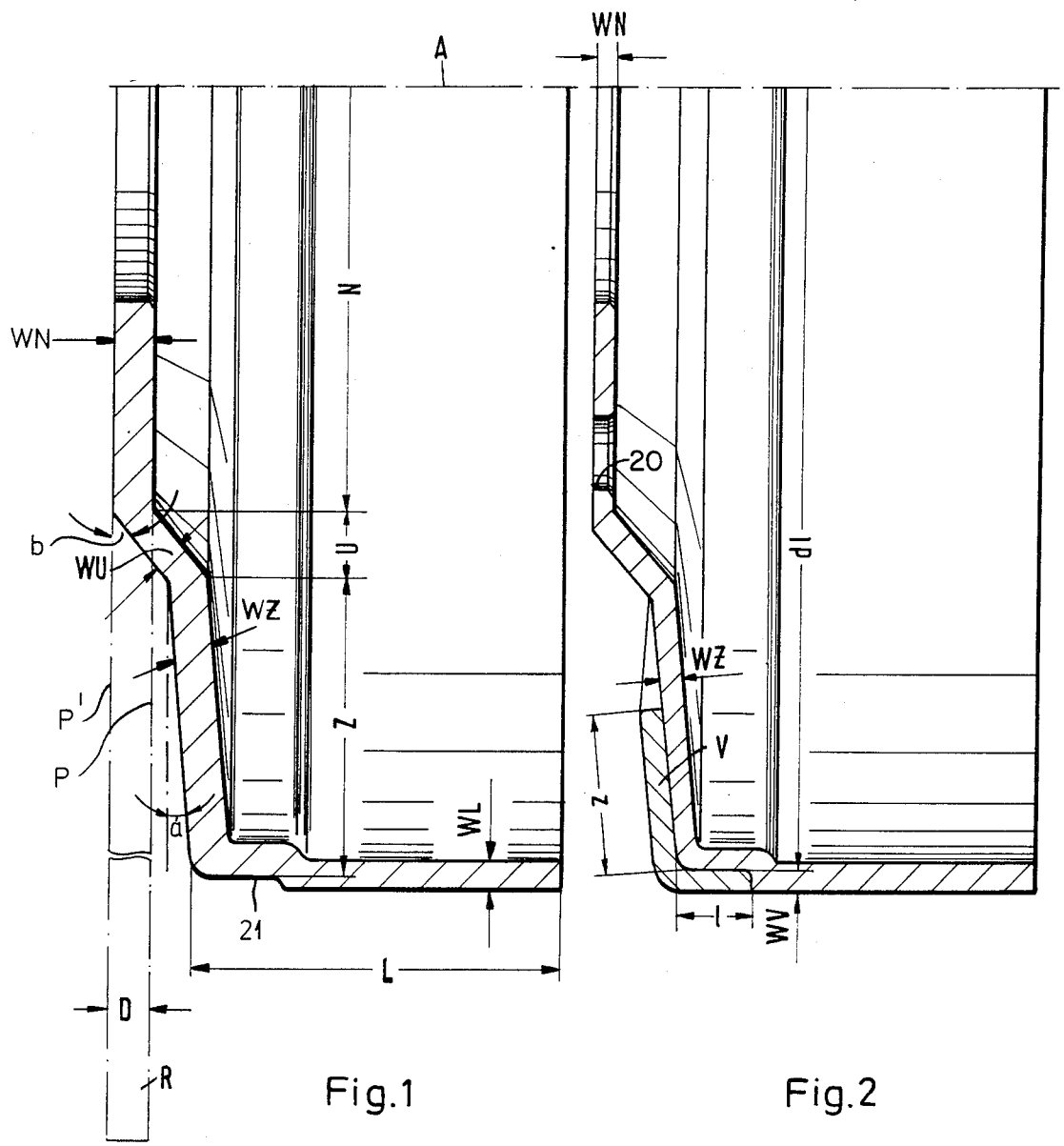
FIG. 1 is a diagrammatic axial section showing the bottom half of the right-hand wheel member of road wheel for a track-laying vehicle embodying the invention, the disk from which the wheel is pressed and projection drawn being represented in dot-dash lines.
FIG. 2 is a view similar to FIG. 1 showing the wheel after turning and the application of a wear ring.

In FIG. 1, we have shown the lower portion of the right-hand wheel half for such a road wheel of a track-laying vehicle as fabricated from a disk R of steel by pressing and projection draw pressing (deep drawing).

As illustrated, this disk has a thickness D and the deep drawn wheel formed therefrom can comprise a generally cylindrical running portion L centered on the axis A of the disk, the wheel half or wheel and the axis with respect to which all portions of the wheel are coaxial.

The running portion L extends to one side of the plane of the disk, in this case to the right, it being apparent that an identical wheel half can be formed and turned so that its running portion extends to the left as is clear from FIG. 5.

Connected to and unitary with the running portion L is a slightly conical portion Z which extends toward the axis and defines a projection angle a with a plane P perpendicular to the axis and, of course, parallel to the plane of the original workpiece disk R.

Connected to this slightly frustoconical portion, which is also referred to herein as the tooth-flanking portion (see FIG. 5) is a steeply conical portion U which is concentric with the axis A and extends toward this axis. The tooth-flanking portion Z has a length which may be a multiple of the length of the steeply conical transition portion. The transition portion defines a projection angle b with a plane P' perpendicular to the axis A and corresponding to or parallel to a plane of the workpiece disk R.

Finally the wheel half has a unitary hub portion N which lies in a plane perpendicular to the axis A and is unitary with the transition portion U.

The hub portion has a thickness WN, the transition portion a wall thickness WU, the tooth-flanking portion a thickness WZ and the running portion a thickness WL. As can be seen from FIG. 2, holes can be provided at 20 to accommodate the bolts.

During the pressing and deep drawing, the wall thickness WL of the running portion L is reduced to 0.6D to 0.8D (inclusive) where D is the thickness of the workpiece disk.

The wall thickness WU=D cos b, the wall thickness WZ=D cos a and the wall thickness WN can be reduced to or turned to 0.5D to 0.7D, or, as shown in FIG. 2 can be turned to this thickness on a lathe or the like.

The wall thickness of the tooth-flanking region as represented at WZ (FIG. 2) can also be turned to 0.5D to 0.7D and, in this case an L-shaped wear-resistant ring V can be applied, e.g. by explosion bonding or welding. The wear-resistant ring can be composed of a steel more highly resistant to wear than the steel of the wheel and can be a so-called "hard faced steel".

The one leg of this L-section ring V can lie along the outer flank of the tooth-engaging portion over the length Z as shown in FIG. 2, while the other leg can be received in a recess 21 formed in the cylindrical running portion L to a depth WV representing the thickness of the second leg of this ring. Consequently, the step of the wheel half forming the recess has a diameter which is reduced by twice the thickness of the wear ring from the diameter of the remainder of the running portion L. Consequently the outer surfaces of the second leg and of the cylindrical running portion are flush with one another.

Figure 3:
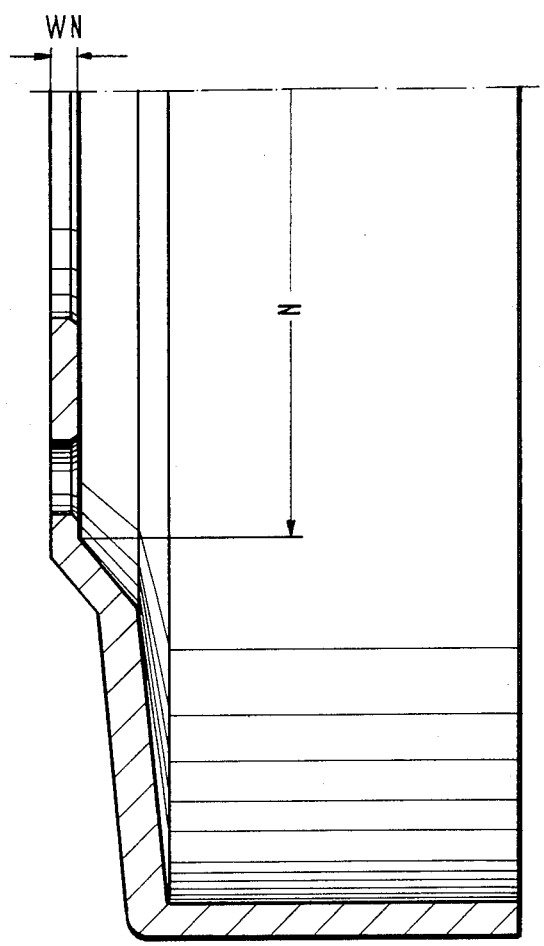
FIG. 3 is a view similar to FIG. 1 illustrating another embodiment of the invention which can be fabricated similarly.

FIG. 3 shows a corresponding wheel half in which the wear ring is not used and wherein the hub portion M is turned to the thickness WN=0.5D to 0.7D.

Depending upon the load the wheel may carry, the disk R may have a thickness D of 0.5 to 2 cm.

We claim:

1. A road wheel for a track-laying vehicle comprising a pair of wheel halves secured together and unitarily defining a cylindrical running surface directly engageable with a track and an outwardly open channel adapted to receive teeth of said track, each wheel half being formed in one piece from a circular steel disk of a thickness D and having a planar hub portion lying perpendicular to an axis of rotation of said wheel, a steeply conical transition portion connected to said hub portion and defining porjection angle b with a plane perpendicular to said axis, a tooth-flanking portion of slight conicity connected to said transition portion and defining a projection angle a with a plane perpendicularly to said axis, and a cylindrical running portion forming said surface, all of said portions being centered on said axis, the wall thickness WU of said transition portion being equal to the product of the thickness D of said disk and the cosine of the projection angle b, the wall thickness WZ of the tooth-flanking portion being equal to the product of the thickness D of said disk with the cosine of the respective projection angle a, and the wall thickness WL of said cylindrical portion being between substantially 0.6D and 0.8D, said hub portion having a wall thickness WN of 0.5D to 0.7D.

2. The wheel defined in claim 1 wherein the wall thickness WL of said cylindrical portion is substantially 0.7D.

3. The wheel defined in claim 2 wherein the wall thickness WN of said hub portion is substantially 0.6D.

4. The wheel defined in claim 1 wherein the wall thickness WZ of the tooth-flanking portion is reduced to 0.5D to 0.7D by removal of material and a wear ring is accommodated against said tooth-flanking portion.

5. The wheel defined in claim 4 wherein said wear ring has an L-shaped cross section and said running surface is formed with a recess to accommodate a leg of the L.

6. The wheel defined in claim 5 wherein the recess formed in said running surface has a depth equal to the thickness of said leg of said wear ring whereby said leg is flush with said surface.

7. The wheel defined in claim 5 wherein the wall thickness of the tooth-flanking portion is substantially 0.6D.

8. A method of making a wheel half adapted to be assembled to form a road wheel of a track-laying vehicle with another half, said method comprising the steps of pressing and deep drawing a steel disk having a thickness D to form a planar hub portion perpendicular to an axis and centered thereon, a steeply conical transition portion connected to said hub portion and of a thickness WU and defining a projection angle b with a plane perpendicular to said axis, a slightly conical tooth-flanking portion having a wall thickness WZ and a projection angle a as defined with a plane perpendicular to said axis, and a cylindrical track-engaging running portion connected to said tooth-flanking portion and having a wall thickness of 0.6D to 0.8D, WZ=D cos a, WU=D cos b; and turning said hub portion to a thickness of 0.5D to 0.7D.

9. The method defined in claim 8, further comprising the step of turning said flanking portion to a thickness of 0.5D to 0.7D to form a recess, and applying a wear-resisting ring thereto.

10. The method defined in claim 9 wherein the recess is extended along said cylindrical portion and said ring is of generally L-shaped cross section, said ring having a leg mounted in said recess flush with the outer surface of said cylindrical portion.

* * * * *